(12) United States Patent
Rochau et al.

(10) Patent No.: US 6,616,116 B1
(45) Date of Patent: Sep. 9, 2003

(54) PNEUMATIC MOTOR VEHICLE SEAT WITH STABILIZED STATIC HEIGHT

(75) Inventors: Stefan Rochau, Hess. Oldendorf (DE); Reiner Lieker, Extertal (DE)

(73) Assignee: Isringhausen GmbH & Co. KG, Lemgo (DE)

( * ) Notice: Subject to any disclaimer, the term of this patent is extended or adjusted under 35 U.S.C. 154(b) by 0 days.

(21) Appl. No.: 09/937,200

(22) PCT Filed: Mar. 26, 2000

(86) PCT No.: PCT/EP00/02664
§ 371 (c)(1),
(2), (4) Date: Sep. 21, 2001

(87) PCT Pub. No.: WO00/58125
PCT Pub. Date: Oct. 5, 2000

(30) Foreign Application Priority Data

Mar. 26, 1999 (DE) .......................................... 199 15 138

(51) Int. Cl.⁷ .................................................. B60N 2/52
(52) U.S. Cl. ...................... 248/564; 248/421; 248/562; 248/588; 248/631
(58) Field of Search ................. 248/550, 562, 248/564, 567, 584, 588, 631, 421; 261/113, 131

(56) References Cited

U.S. PATENT DOCUMENTS

| 4,148,518 A | 4/1979 | Vilbeuf ..................... 296/65 R |
|---|---|---|
| 4,213,594 A | 7/1980 | Pietsch et al. .............. 248/550 |
| 4,397,440 A | 8/1983 | Hall et al. .................. 248/550 |
| 4,589,620 A * | 5/1986 | Sakamoto .................... 248/550 |
| 5,098,062 A * | 3/1992 | Lungu ...................... 251/129.2 |
| 5,125,631 A | 6/1992 | Brodersen et al. .......... 267/131 |
| 5,176,355 A | 1/1993 | Carter ........................ 248/550 |
| 5,346,170 A | 9/1994 | Schmidt et al. ............. 248/550 |
| 5,533,703 A | 7/1996 | Grassl et al. ............... 248/550 |
| 5,570,866 A | 11/1996 | Stephens ..................... 248/631 |
| 5,735,509 A | 4/1998 | Gryp et al. ................. 267/131 |
| 5,975,508 A * | 11/1999 | Beard ....................... 180/89.12 |
| 6,070,613 A * | 6/2000 | Sugita et al. ........... 137/625.43 |

FOREIGN PATENT DOCUMENTS

| DE | 30 03 578 A1 | 8/1981 |
|---|---|---|
| DE | 32 19 371 A1 | 11/1983 |
| DE | 19803750 A1 * | 8/1998 |
| EP | 0 873 905 A2 | 10/1998 |
| JP | 404201746 A * | 7/1992 |

* cited by examiner

Primary Examiner—Ramon O. Ramirez
Assistant Examiner—Jon Szumny
(74) Attorney, Agent, or Firm—Hedman & Costigan (57) ABSTRACT

A pneumatic motor vehicle seat, whose static height is held constant independently of the weight of the respective seat occupant. The inventive device provides a magnetically actuated air valve (16) which is enclosed 20 in a plastic valve housing for aerating and deaerating the pneumatic valve. The air valve is controlled by an external permanent magnet and according operates, quietly, cleanly and with little wear. Also a motor vehicle seat includes an integrated height adjustment mechanism, comprising a control system which automatically and simultaneously dampens the vehicle seat vibrations to a maximum, whilst the static height is being adjusted.

6 Claims, 5 Drawing Sheets

PNEUMATIC MOTOR VEHICLE SEAT WITH STABILIZED STATIC HEIGHT

BACKGROUND OF THE INVENTION

The invention relates to a motor vehicle seat supported so as to be able to vibrate by means of a mechanical vibration system and a pneumatic spring having the characteristic features of the preamble of claim 1 for holding the static height of the motor vehicle seat constant independently of the weight of the respective seat occupant.

Motor vehicle seats of this type are known from DE 27 53 105 C2 filed by the applicant. They operate with a control cam whose end-side trigger cams mount the valve plunger of an aerating valve dependent on the vibration travel when the vibration travel of the vibration system exceeds a level deemed acceptable above or below the motor vehicle seat's static height to be held constant. The air pressure in the pneumatic spring decreases or increases accordingly. When the respective vibration travel reverses its motion and shortly before reaching the static height to be held constant the respective open valve is closed again in that the trigger cam of the control cam is pulled down again from the valve plunger by the trigger cam.

In order to achieve such varying distances between the vibration travel switch positions and the constant static height when opening and closing the valves, the motor vehicle seat known in the art operates with a so-called trailing control cam, where a driving pin mounted on a rod of the scissors-type rod vibration system first has to pass a certain trailing distance in a trailing distance recess of the control cam after the respective vibration has reversed its motion until it stops at the end of the trailing distance recess and is able to pull down the trigger cam of the control cam from the valve plunger of the valve.

The invention is based on the above state of the art. One objective of this invention is to reduce the problems of noise and wear related to this kind of trailing control system.

Also, previously the seats always had the disadvantage that the seats were able to freely vibrate upward from the respectively set static height up to the limit stop. This means that the upper part of the seat, including the driver, is able to vibrate up to said upper limit stop, for example when the driver gets up. With a height adjustment range of 100 mm, for example, and a vibration travel of +/−40 mm, for example, this could mean an upward vibration of up to 140 mm in the lowest height adjustment position. One potential consequence is that the driver is hampered when he exits the vehicle.

Therefore, another objective of the invention is to provide a motor vehicle seat in which the maximum vibration is adjustable so as to prevent the above disadvantages.

Noise problems in the known trailing control systems are primarily caused by the driving pin mounted on the vibration system striking the ends of the trailing distance recess of the control cam and also by the trigger cams of the control cam striking the plunger of the valves before they are able to mount said valve plungers. Said striking noises intensify as the trailing control cam gets dirtier and thus moves more sluggishly.

The problems of wear in the known trailing control cams are primarily related to the trigger cams of the control cam and the valve plungers of the valves and have increased in recent years because the on-board compressed air systems of the motor vehicles which also supply compressed air to the pneumatic spring of the motor vehicle seat increasingly operate at a higher pressure level.

SUMMARY OF THE INVENTION

To solve the problem of reducing noise and wear in trailing control systems it is proposed in accordance with the invention to omit in a motor vehicle seat operating according to the method of DE 27 53 105 C2 for holding the static height constant the above mechanical trailing control cam with said valves and instead using valves and a control system which are characterized in that the valves each have a stopping device (for example in the form of a cylinder piston, a ball, or the like), which lifts off of its valve seat for opening the valve against the force of a closing spring, where the stopping device consists of a ferromagnetic material and is disposed in a plastic valve housing and where the control system for opening the valves consists of a control lever or a control carriage with a permanent magnet that approaches the stopping device of the aerating valve non-contacting dependent on the vibration travel in such a way that the respective stopping device in the open valve position has a distance from the permanent magnet which is shorter, yet non-contacting, by the lifting motion of the stopping device from its valve seat.

The inventive solution offers considerable advantages.

For one, by using a permanent magnet positioned in a pivoting control lever or a shifting control carriage the stopping device of an aerating valve or a deaerating valve can be actuated without requiring any mechanical contact between said components for this purpose.

Thus, the problem of wear between said components is prevented. The proposal of installing a permanent magnet in the control lever or control carriage suggests itself because no power supply lines have to be installed in the moving parts as would be the case if a similarly acting magnetic field were to be provided by means of current-carrying electrical conductors, which is also feasible, in principle.

The strength of the magnetic field is not affected by a valve housing, which, according to the theory of the invention, consists of plastic, but it is affected by the ferromagnetic material of which the stopping devices of the valves have to be made. Said materials provide a considerable field-strengthening effect for the magnetic field. The magnetic field acts as a pulling force both on the opposite pole surfaces of the permanent magnet and on the respective stopping device, which force also depends, among others, on the distance between the permanent magnet and the stopping device.

The above physical facts are employed by the theory of the invention in that in the open valve position the respective stopping device has a distance from the permanent magnet which is shorter by the lifting motion of the stopping device from its valve seat. Then the magnetic attractive powers are higher with the result that the valve will be held longer in its open position when the control lever or control carriage with the permanent magnet is moved away from the stopping device of the valve dependent on the vibration travel. In other words, the point in time of closing the valve "trails" relative to the motion of the permanent magnet which is controlled by the vibration travel similar to the state of the art with the mechanical trailing control cam, but having the very substantial advantage that said trailing process in accordance with the theory of the invention is now non-contacting and thus results in less wear and less noise.

An especially suitable practical embodiment of the invention is proposed which is characterized in that both valves (aerating valve and deaerating valve) are housed in a common plastic valve housing (as is basically known in the art) and that they are oriented relative to each other such that their respective stopping devices perform lifting motions off of their respective valve seats which are parallel and oriented in the same direction. The common plastic valve housing is intended to largely hermetically seal the valve parts against external effects, pollution and the like, and the permanent magnet should be mounted on a pivoted lever which is disposed so as to pivot on an external wall surface of the valve housing and, in dependence of the vibration travel, causes the permanent magnet on the external wall surface of the valve housing and transversely to the lifting motions of the stopping devices to approach the respective stopping devices such that in the final stage of approaching the pole surface of the permanent magnet is plane-parallel opposite and at a distance of the preferably plane bottom area of the stopping device.

With the inventive solution of holding the static height of a motor vehicle seat constant an integrated height adjustment for the vibration system can be combined easily and cost-effectively, which, in accordance with claim 3 of this invention, is characterized in that the valve housing is mounted so as to turn about an axis at the crossing point of a scissors-type rod vibrating system and that the precise turning position of the valve housing can be adjusted and set by means of a Bowden cable mounted on the scissors-type rod and on the valve housing, which can be tension and/or pressure loaded. It is also preferable that the turning position of the valve housing is electrically adjustable, preferably by means of a servomotor which is actuated by means of a potentiometer, for example. This advantageously also allows the implementation of memory effects in the seat, i.e. pre-defined seat parameters can be stored and recalled.

The second objective of this invention, namely providing a motor vehicle seat where the maximum seat vibration is adjustable, is achieved in accordance with the invention based on the associated claim 4. Advantageous embodiments are provided in the respective sub-claims.

Accordingly, this invention provides a motor vehicle seat with an integrated static height adjustment mechanism comprising a control system with which a constant maximum vibration of the motor vehicle seat is adjustable automatically and simultaneously with the static height adjustment.

Said control system corresponds to a traveling height limit stop and ensures a constant maximum seat vibration at any height position or a constant free seat vibration travel upward or downward or especially preferably both upward and downward. This means that regardless of the height position at which the motor vehicle seat is set a determinable constant seat vibration from said height position setting van be adjusted or controlled by means of the control system. This prevents the motor vehicle seat from being able to vibrate freely upward or downward from the set height position to the limit stop and thus could hamper the driver, for example in exiting the vehicle. The traveling height limit stop ensures that while the motor vehicle seat provides a certain comfortable springiness for the driver, which is necessary, for example when passing over an uneven surface or a bump in the road, it also prevents the vibration coupled with the suspension from being so strong that it is uncomfortable or inconvenient for the driver.

In a preferred embodiment of the seat of the invention the control system has at least an eccenter and a catch lever where the eccenter and catch lever are movable relative to each other dependent on the seat vibration up to a certain limit stop position and interact such that a constant maximum seat vibration is adjustable simultaneously and automatically with every height position adjustment. Especially preferably the maximum absolute vibration path is defined by the constant maximum vibration path via the height setting.

The eccenter is equivalent to a circular disk, preferably a circular disk whose circumference has a toothed surface, at least in part. Said circular disk is positioned outside the center of the circle. It is preferably disposed so as to turn at the center bearing point of the seat's vibration system. A toothed ring is preferably disposed on the eccenter which is also disposed so as to turn in the center bearing point and which is firmly connected with the eccenter.

The catch lever is disposed so as to move between the inside and outside scissors of the seat's vibration system and it preferably also has a toothed surface, at least in part.

In the home position of the motor vehicle seat the eccenter and the catch lever have a certain adjustable distance from each other where advantageously the respective toothed areas on the eccenter and the catch lever are opposite.

When the vibration system of the motor vehicle seat springs upward, for example, because of a bump in the road, for example,a relative motion between the catch lever and the eccenter takes place. When the motor vehicle seat vibrates the angle between the inside and outside scissors of the seat's vibration system changes, i.e. when the motor vehicle seat vibrates upward the angle becomes larger accompanied by a motion of the catch lever disposed on the inside and outside scissors in the direction toward the eccenter. This means that as the vibration of the motor vehicle seat from its home position increases the angle between the inside and outside scissors of the seat's vibration system continues to increase and consequently the distance between the catch lever and the eccenter decreases accordingly. At a certain vibration level a limit stop position is reached at which the catch lever and the eccenter meet, preferably with their respective toothed areas, and thus stop the motor vehicle seat from vibrating further.

In order to change the static height adjustment of the vibration system while holding the maximum seat vibration constant, the eccenter on the center bearing point is radially adjusted simultaneously and automatically with the static height adjustment such that this results in another stop limit, which is adapted to the respective height adjustment, on the toothed eccenter area so that the distance between the catch lever and the eccenter, and thus the maximum vibration, remain constant. This means that the same maximum vibration and the same free upward vibration path have been realized for every height position adjustment. In other words, the adjustment of the motor vehicle seat's static height corresponds to a respective adjutment of the angle between the inside and outsides scissors of the seat's vibration system. As explained above, however, this is accompanied by a motion of the catch lever disposed thereon relative to the eccenter, which means that the distance between the catch lever and the eccenter would initially be changed. In order to ensure a constant height limit stop, however, the distance between the catch lever and the eccenter has to be the same at every height position of the seat. This is achieved by the invention in that the eccenter is turned in accordance with the relative motion of the catch lever at every new height position adjustment such that the distance between the catch lever and the eccenter remains constant. This is made possible by positioning the eccenter outside the center of the circle.

In a preferred embodiment of the motor vehicle seat the automatic and simultaneous adjustment of the eccenter relative to each new static height adjustment of the motor vehicle seat is made by means of a gear, preferably by means of a two-stage gear.

The two-stage gear preferably consists of a first tooth lever and a second tooth lever. The first tooth lever is preferably firmly connected with the air valve, which is also disposed so as to turn on the center bearing point. The second tooth lever is disposed so as to turn on the inside scissors. The latter serve for the necessary transmission of the varying rotational angle between the air valve and the eccenter when the static height is adjusted. Therefore, the second tooth lever has two toothed rings disposed one above the other and firmly connected, where the diameter of the toothed rings is selected based on the desired or required transmission. The eccenter, the first and second toothed levers are disposed relative to each other such that the toothed ring of the first tooth lever engages in one of the two toothed rings of the second tooth lever while the toothed ring disposed on the eccenter engages in the other of the two toothed rings of the second toothed lever.

As explained above, every time the height of the motor vehicle seat is adjusted the angle between the inside and outside scissors of the vibrating system changes accordingly as a result of a change in the position of the height adjustment valve.

This is accompanied by a turn of the first tooth lever on which the Bowden cable also engages. Because of the interlocking, said turn of the first tooth lever causes the second tooth lever to turn which, again because of the respective engaging tooth rings, causes the eccenter to turn. The necessary transmission is determined by selecting the tooth ring diameters, namely the angle about which the eccenter has to be turned so that the distance between the eccenter and the catch lever remains constant at a certain height adjustment.

The valve setting angle is preferably between 15° and 50°, especially preferably between 30 and 40°, particularly preferably between 33 and 37°. The setting angle of the tooth lever 2 is preferably between 50 and 140°, preferably between 70 and 110°, especially preferably 90°, and the setting angle of the eccenter is preferably between 100 and 210°, especially preferably between 130 and 190°, particularly preferably between 165 and 175°. The ratio between the valve and the eccenter thus achieved is defined by the preselected setting angles and is especially preferably approx. 1:4.7.

BRIEF DESCRIPTION OF THE DRAWINGS

An exemplary embodiment of the invention will be discussed below in more detail based on the drawings, as follows:

FIGS. 1 to 4 show the new air valve in various control lever pivoting positions with the respectively associated valve positions.

FIGS. 7 to 9 show simplified side views of a motor vehicle seat with a control system of the invention for automatically adjusting a maximum vibration of the motor vehicle seat.

DETAILED DESCRIPTION OF THE EMBODIMENT

Figure 5:
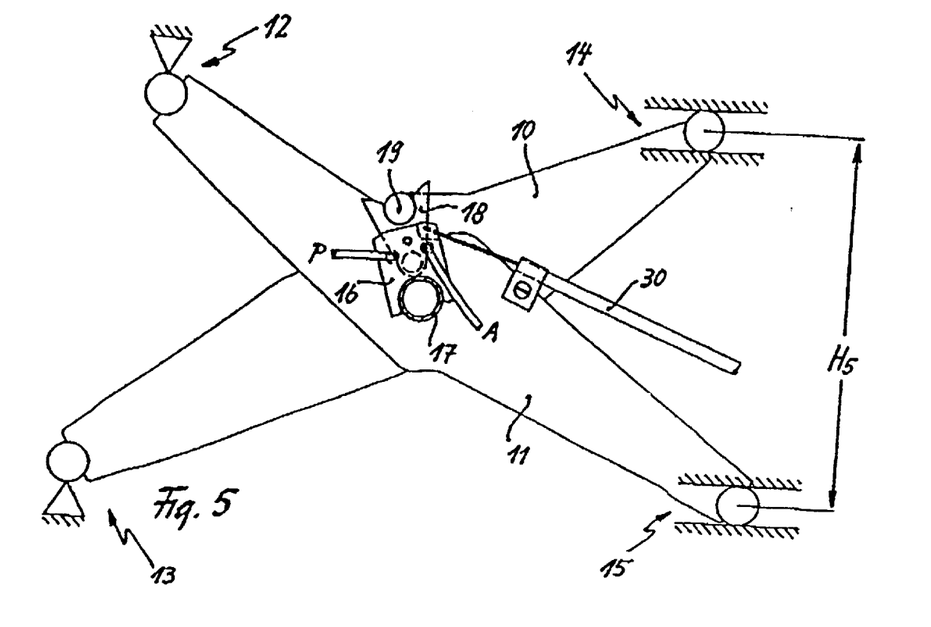
FIGS. 5 and 6 are simplified side views of a scissors-type rod vibrating system with the new air valve.

FIG. 5 shows a simplified side view of a scissors-type rod vibration system for motor EMS A vehicle seats as is known in the art. Each of the scissors-type rods 10 and 11 is disposed by means of a fixed bearing 12 and 13 on the left side of the drawing and by means of a movable bearing (= horizontal shifting bearing 14 and 15) on the right side of the drawing on or in the seat frame and on or in the floor frame of the motor vehicle seat. The vibration system further comprises a pneumatic spring (not shown as it is known in the art) that supports the vibration system so as to be able to vibrate and whose pneumatic spring internal pressure is controlled by aerating (= increasing the air pressure) and by deaerating (= decreasing the air pressure) such that the motor vehicle seat vibrates by a predefined static height regardless of the weight of the respective seat occupant, i.e. the static height remains constant.

In order to automatically hold the static height constant the so-called air valve 16 is used (see FIG. 5) in whose plastic housing an aerating valve and a deaerating valve are integrated as described in more detail below by means of FIGS. 1 to 4. The aerating valve is connected via the compressed air line A shown in FIG. 5 with the pneumatic spring and via the compressed air line P with the on-board compressed air supply system of the vehicle.

The air valve 16 sits on the axis 17 at the crossing point of the scissors-type rod vibrating system and is able to turn about said axis. According to claim 3 of this invention, a Bowden cable 30 is provided for this purpose which engages on the air valve 16 on one side and on the other side it is attached to the scissors-type rod 11. The Bowden cable can be tension and/or pressure loaded so that the precise turning position of the air valve can be adjusted and set by means of the Bowden cable.

A control lever (pivoted lever 18) is disposed on the air valve 16 by means of which the aerating and deaerating valves integrated in the air valve are controlled as described below in more detail by means of FIGS. 1 to 4. The control lever 18 is moved in dependence of the vibration travel by means of a driving pin 19 which is mounted on the scissors-type rod 10 of the vibration system.

Figure 6:
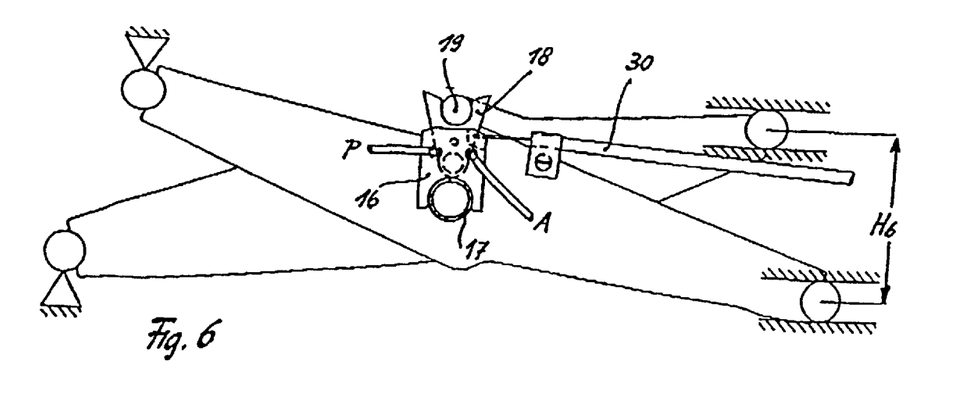

When the precise turning position of the air valve 16 relative to the driving pin 19 of the vibration system is changed by means of the Bowden cable 30 then the static height of the motor vehicle seat by which the seat is supposed to vibrate will change. This is made more evident by a comparison between FIGS. 5 and 6. In FIG. 5, the static height of the motor vehicle seat is at an upper height position $H_5$ and in FIG. 6 the static height is at a lower height position $H_6$.

Such integrated height adjustment options for the vibration system of a motor vehicle seat were designed previously in combination with the known trailing control cams (see DE 33 33 604 A1 filed by the applicant), however, they required considerably more effort and were much more susceptible to breaking down. The newly proposed solution with the Bowden cable adjustment for the new air valve 16 relative to the driving pin 19 of the vibration system is convincingly simple and highly reliable.

Figures 1A, 1B, 2A, 2B, 3A, 3B, 4:
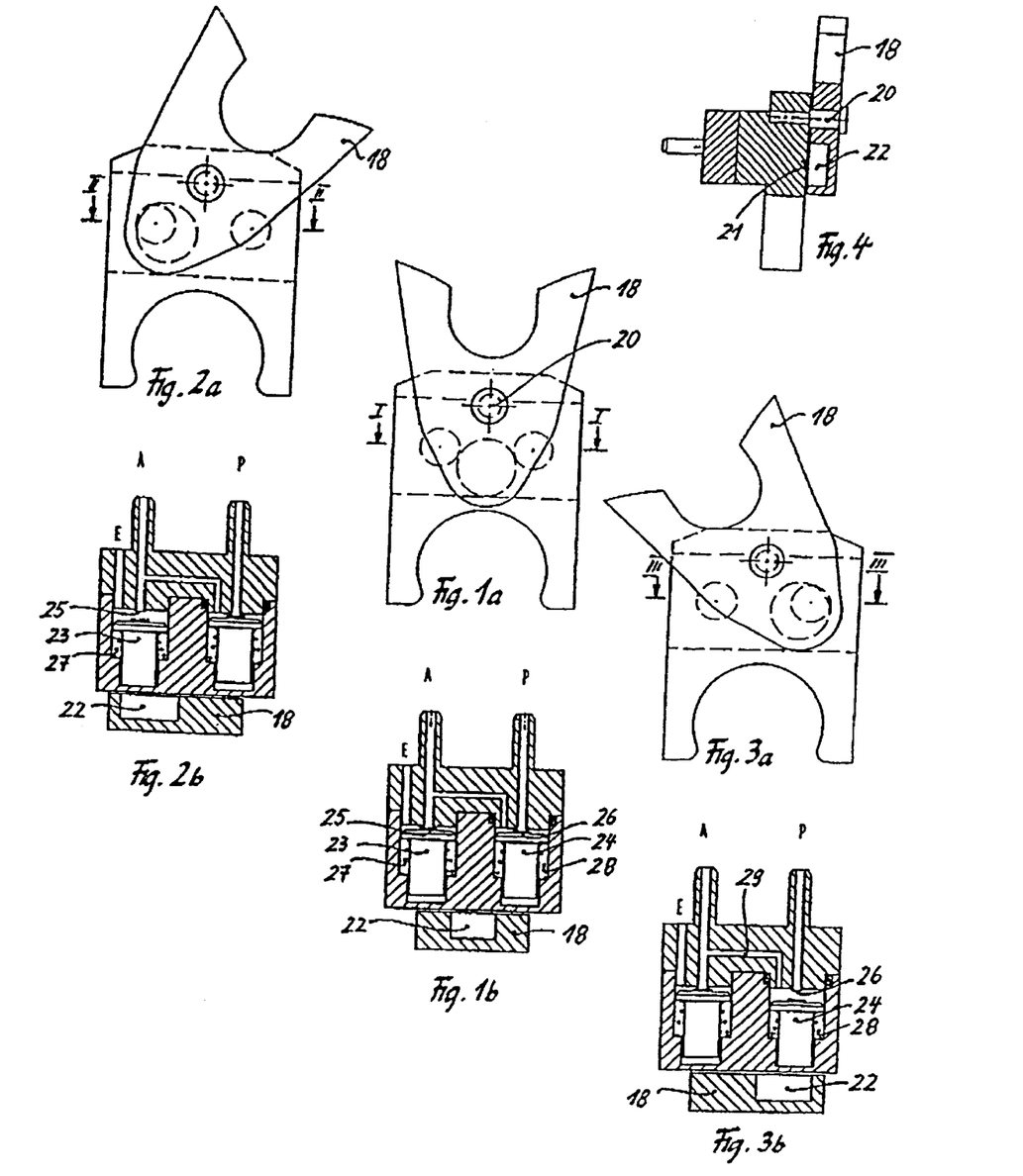
Figure 4:
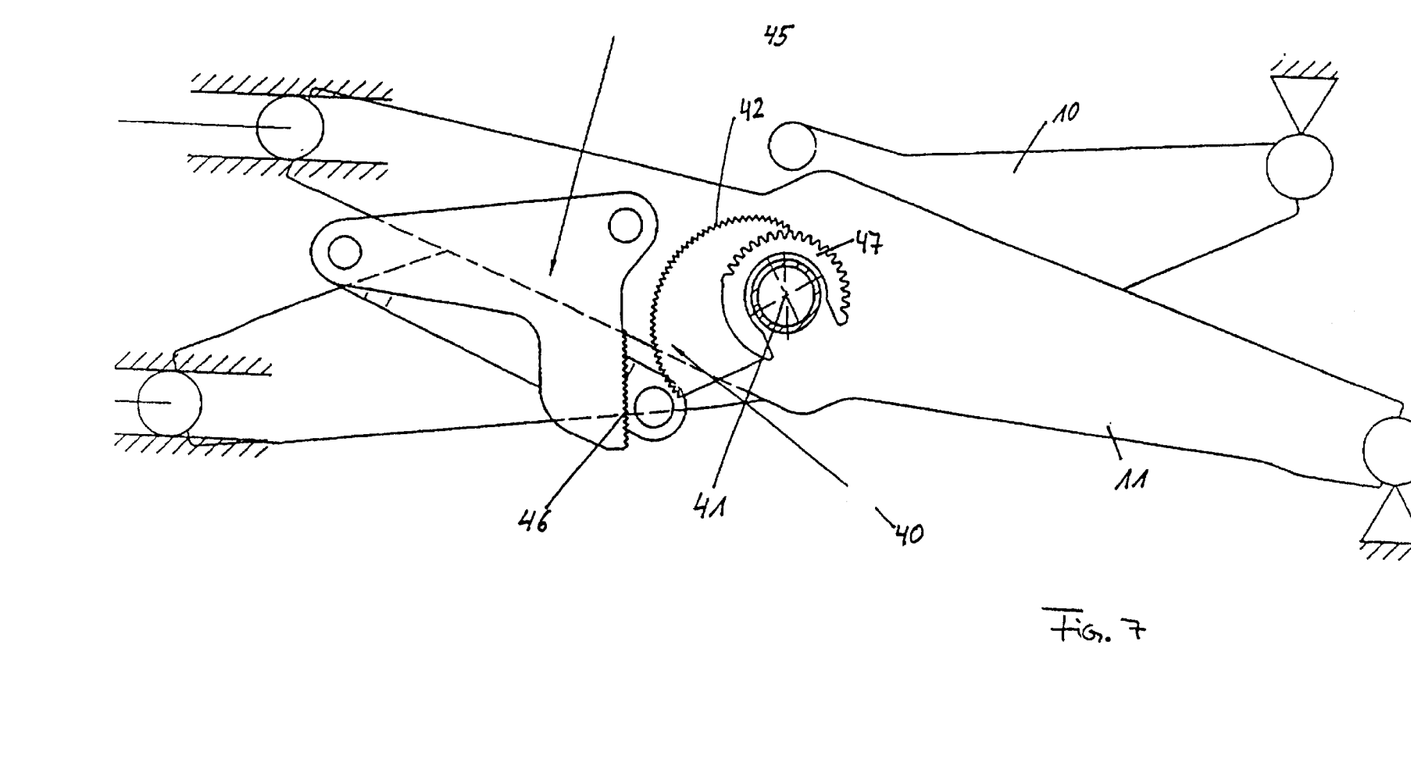

FIGS. 1 to 4 illustrate the new air valve with the control lever 18 in more detail. The control lever is mounted so as to pivot on the pivoting pin 20 on the external wall surface 21 of the valve housing for the air valve, as shown by FIG. 4 in connection with FIGS. 1a, 2a and 3a. In the bottom part of the control lever the permanent magnet 22 is disposed sunk-in. Its pole surface moves closely but virtually non-contacting over the external wall surface 21 of the valve housing.

FIGS. 1a, 2a and 3a show the three fundamental pivoting positions of the control lever, namely in FIG. 1a the center position of the control lever at the static height of the motor vehicle seat and in which both the aerating valve and the deaerating valve are closed. In FIG. 2a the control lever is in a pivoted position in which the aerating valve is open, and FIG. 3a shows the pivoted position of the control lever where the deaerating valve is open.

A cross-sectional view as per FIGS. 1b, 2b and 3b is associated with each of FIGS. 1a, 2a and 3a, corresponding to a cross-section through the sectional planes I—I, II—II and III—III, respectively, in FIGS. 1a, 2a and 3a. Said cross-sections show the respective valve positions.

In FIG. 1b the permanent magnet 22 is in its center position. Both stopping devices 23 and 24 are not or only marginally covered by the magnetic field of the permanent magnet so that both the aerating valve formed by the stopping device 23 with its associated valve seat 25, and the deaerating valve formed by the stopping device 24 with the valve seat 26 are closed by means of their respective closing springs 27 and 28.

In FIG. 2b the control lever 18 with the permanent magnet 22 is in its left-side pivoting position so that the ferromagnetic stopping device 23 is covered by the magnetic field of the permanent magnet and acts so as to strengthen the field. The force resulting from the higher magnetic flux density pulls the stopping device 23 off of its valve seat 25 against the force of the closing spring 27 so that the aerating valve 23/25 is open and compressed air is able to escape from the pneumatic spring via the compressed air connection A and the outflow boring E.

In FIG. 3b the aerating valve 23/25 is closed and the permanent magnet 22 is in front of the stopping device 24 of the deaerating valve 24/26. Accordingly, the deaerating valve 24/26 is open and compressed air from the on-board network of the motor vehicle passes via the compressed air connection P and the bypass line 29 into the compressed air line A to the pneumatic spring.

The cross-sections of the various valve positions in FIGS. 1b, 2b and 3b illustrate the compact and largely hermetically sealed arrangement of all valve components in the common plastic valve housing. The valves in said enclosed configuration operate very quietly, cleanly and smoothly. The permanent magnet moving outside the sealed valve housing has no mechanical contact with the valve components. Therefore, the problems of wear between the control lever and the valve components are prevented.

FIG. 7 shows a side view of a scissors-type rod vibrating system for motor vehicles where the vibration system comprises a control system according to the invention with which the maximum vibration of the motor vehicle seat is adjustable automatically and simultaneously with the static height adjustment.

In the preferred embodiment of the invention shown here the control system consists of an adjustable eccenter 40 and a catch lever 45. The eccenter 40 is mounted so as to turn on the cross bearing point 41 of the vibration system. The catch lever 45 is also movable and preferably disposed between the inside scissors 10 and the outside scissors 11 of the vibration system. When the vibration system vibrates upward, for example because of a bump in the road, this causes a relative motion simultaneously and automatically between the catch lever 45 and the eccenter 40. This then causes a toothed area 46 of the catch lever 45 to strike against an area 42 of the eccenter 40 which is also toothed, thereby reaching the maximum vibration.

Figure 8:
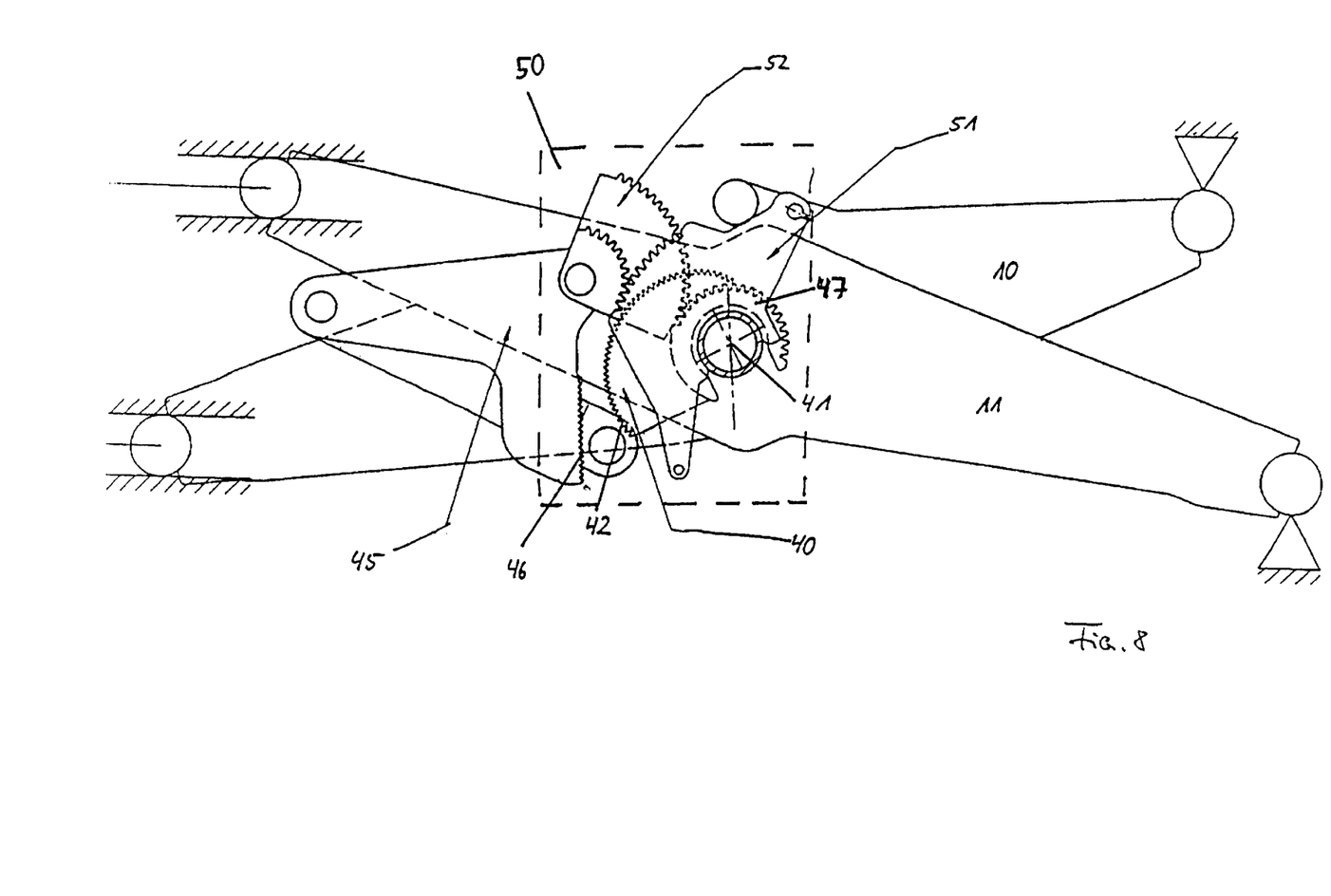

FIG. 8 shows a side view of a scissors-type rod vibration system of another motor vehicle seat of the invention with the control system of the invention. Said control system also comprises an adjustable eccenter 40 and a catch lever 45.

Furthermore, the control system comprises a two-stage gear 50 consisting of a first tooth lever 51 and a second tooth lever 52.

By means of the two-stage gear 50 the eccenter 40 can be adjusted to the cross bearing point 41. Depending on the static height adjustment it is necessary to adjust the eccenter 40 accordingly so as to achieve that the maximum vibration of the motor vehicle seat is constant at every height adjustment.

The first tooth lever 51 is firmly connected with the air valve 16 which is also disposed so as to turn on the cross bearing point 41. The second tooth lever 52 is disposed so as to turn on the inside scissors 10 and serves for the required transmission of the various rotational angles between the air valve 16 and the eccenter 40 when the static height is adjusted. The second tooth lever 52 comprises two toothed rings having different diameters disposed one above the other. One of the two toothed rings is disposed relative to the first tooth lever 51 such that it engages in its teeth. When the static height of the motor vehicle seat is changed the first tooth lever 51, which is disposed so as to turn, is turned simultaneously. Because the first tooth lever 51 is interlocked with one of the two toothed rings on the second tooth lever 52 the second tooth lever 52 also turns simultaneously. Said turn, again because of the interlocking of the other of the two toothed rings on the second tooth lever 52 with the toothed ring 47 disposed on the eccenter 40 and firmly connected with the eccenter, causes the eccenter to turn accordingly.

This results in a limit stop on the toothed eccenter area which is based on the height adjustment so that the maximum vibration remains constant. The rotational angle of the air valve 16 when the static height is adjusted is in the range between 0° and 40°.

In order to obtain a constant distance between the catch lever 45 and the eccenter 40 in non-operative condition at every static height the rotational angle accordingly has to be in a range between 0° and 170°. Such necessary transmission is achieved by means of the two-stage gear 50.

Figure 9:
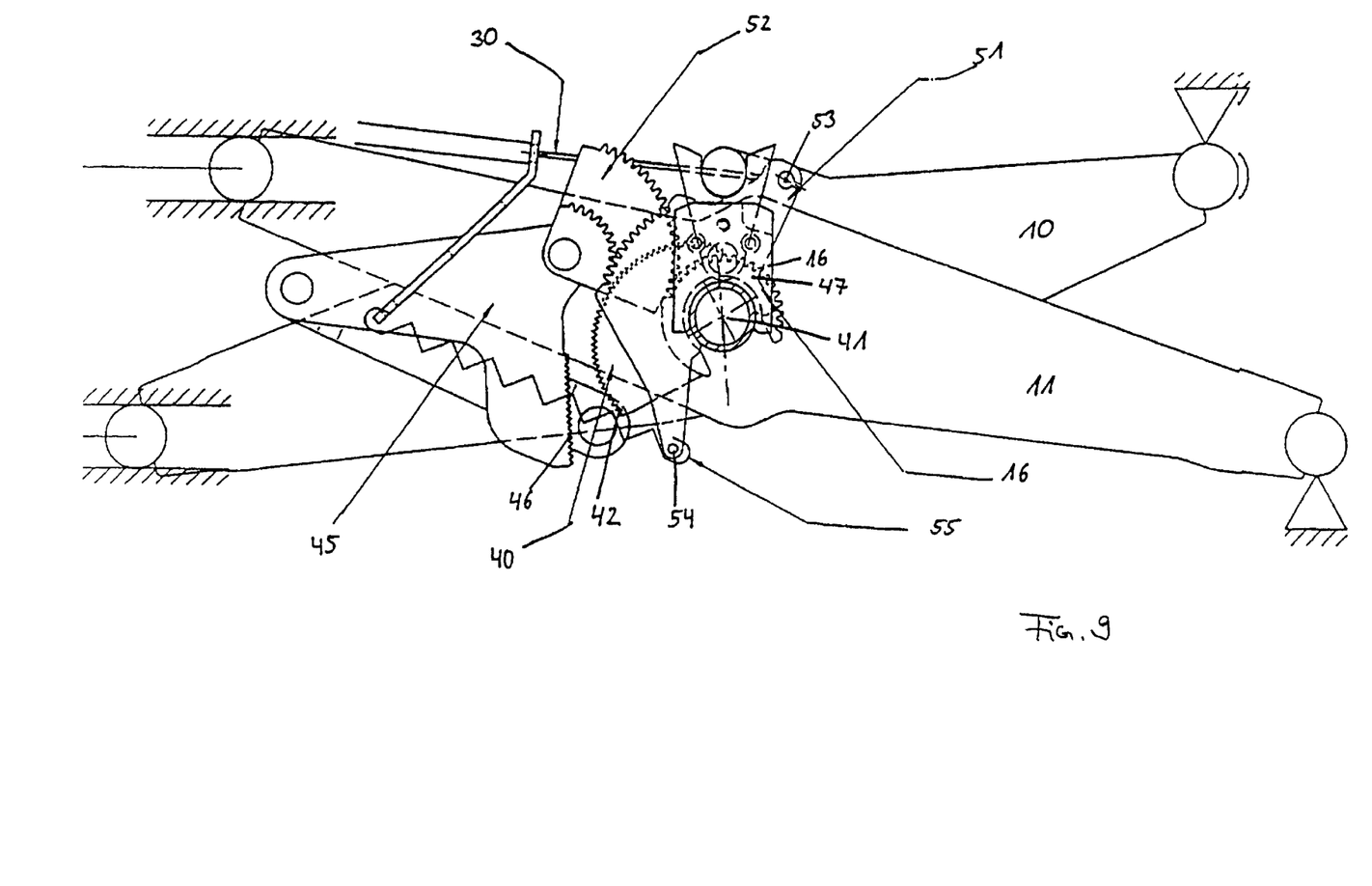

FIG. 9 shows a further embodiment of a vibration system of a motor vehicle seat of the invention.

The air valve 16 is connected via respective compressed air lines with the pneumatic spring and with the on-board compressed air supply system for the vehicle.

As mentioned above, the air valve 16 is disposed so as to turn on the cross bearing point. In order to turn the air valve 16 a Bowden cable 30 is provided which at one connecting point 53 of the Bowden cable 30 engages firmly on the first tooth lever 51 and which is also connected with the tooth lever 51 via a tension spring 55 at a connecting point 54 of the tension spring 55 in the first tooth lever disposed on the scissors-type rod. Said tooth lever 51 is firmly connected with the air valve 16. The Bowden cable 30 can be tension and/or pressure loaded so that by means of the Bowden cable 30 the precise turning position for the air valve 16 can be adjusted and set. By means of the two-stage gear 50 described under FIG. 8 the eccenter 40 is then automatically adjusted based on the adjustment of the air valve 16.

REFERENCE LIST 10, 11 scissors-type rod
12, 13 fixed bearing
14, 15 horizontal shifting bearing 16 air valve
17 axis
18 control lever
19 driving pin
20 pivoting pin
21 external wall
22 permanent magnet
23, 24 stopping device
25, 26 valve seat
27, 28 closing spring
30 Bowden cable
40 eccenter
41 cross bearing point
42 toothed area of the eccenter
45 catch lever
46 toothed area of the catch lever
47 toothed ring disposed on the eccenter
50 two-stage gear
51 first tooth lever
52 second tooth lever
53 connecting point Bowden cable in the first tooth lever (51)
54 connecting point tension spring in the first tooth lever
55 tension spring

What is claimed is:

1. A motor vehicle seat supported to vibrate by means of a mechanical vibration system and a pneumatic spring
    wherein static height is held constant automatically independently of the weight of the respective seat occupant wherein said mechanical vibration system actuates an aerating valve or a deaerating valve for lowering or raising said pneumatic spring independent of the vibration travel by means of a control system
    wherein the deaerating valve is opened by a vibration travel exceeding the static height, and the acrating valve is opened by a vibration travel falling below the static height, and that said valves are closed after reversal of the respective vibration travel and before the static height is reached,
    wherein the distance between vibration travel switching positions and the static height when the valves are closed is shorter than the distance between the vibration travel switching positions and the static height when the valves are opened to provide a trailing distance for holding the valves in the open position,
    wherein the valves each comprise a stopping device (23, 24) that lifts off of a valve seat (25, 26) for opening the valve against the force of a closing spring (27, 28),
    wherein the stopping device (23, 24) consists of a ferromagnetic material and is disposed in a plastic valve housing,
    and the control system for opening the valves consists of a control lever (18) or a control carriage with a permanent magnet (22) which approaches the stopping device of the aerating valve (24/26) or the stopping device of the deaerating valve (23/25) in a non-contacting manner dependent on the vibration travel in such a way that the respective stopping device (23, 24) in the valve open position is a non-contacting distance from the permanent magnet which is shorter than the total valve height because the valve in the open position is closer to the permanent magnet (22) due to the lift off motion of the stopping device from its valve seat.

2. The motor vehicle seat according to claim 1, wherein the stopping device (24) of the aerating valve and the stopping device (23) of the deaerating valve are disposed in a common valve housing having lift off motions from their valve seats (26, 25) which are parallel and oriented in the same direction,
    the valve housing largely hermetically seals the stopping devices and the respective ranges of their lift off motions against external effects
    and the permanent magnet (22) is mounted on said control lever (18) which is disposed so as to pivot on an external wall surface of the valve housing dependent on the vibration travel, and causes the permanent magnet to approach the respective stopping devices on the external wall surface of the valve housing transversely to the lift off motions of the stopping devices, such that in the final stage of approach the pole surface of the permanent magnet (22) is plane-parallel opposite, and at a distance from a preferably plane bottom area of the respective stopping device (23, 24).

3. The motor vehicle seat according to claim 2 with integrated height adjustment, wherein
    the valve housing is disposed so as to turn about an axis (17) at the crossing point of a scissors-type rod vibration system,
    and the precise turning position of the valve housing can be adjusted and set by means of a Bowden cable (30) mounted on the scissors-type rod and on the valve housing and loaded by tension and/or pressure.

4. The motor vehicle seat with integrated height adjustment, according to any of the preceding claims, wherein the motor vehicle seat comprises said control system with which the maximum vibration of the motor vehicle seat is adjustable automatically and simultaneously with the static height adjustment.

5. The motor vehicle seat according to claim 4, wherein the control system comprises at least an eccenter (40) and a catch lever (45), where the eccenter (40) and the catch lever (45) are movable relative to each other dependent on the motor vehicle seat vibration, up to a limit stop position, and interact with each static height adjustment, wherein a constant maximum vibration of the motor vehicle seat is adjustable automatically and simultaneously.

6. The motor vehicle seat according to claim 5, characterized in that the eccenter (40) is adjustable relative to any static height adjustment by means of a two-stage gear (50).

* * * * *